(12) United States Patent
Haeufgloeckner

(10) Patent No.: US 10,179,372 B2
(45) Date of Patent: Jan. 15, 2019

(54) WELDING CONTROLLER AND METHOD FOR CONTROLLING A WELDING OPERATION

(71) Applicant: Robert Bosch GmbH, Stuttgart (DE)

(72) Inventor: Juergen Haeufgloeckner, Schneeberg (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 14/717,699

(22) Filed: May 20, 2015

(65) Prior Publication Data

US 2015/0336200 A1    Nov. 26, 2015

(30) Foreign Application Priority Data

May 21, 2014    (DE) .................. 10 2014 209 617

(51) Int. Cl.
*B23K 11/30*    (2006.01)
*B23K 11/25*    (2006.01)

(52) U.S. Cl.
CPC ........ *B23K 11/3063* (2013.01); *B23K 11/257* (2013.01)

(58) Field of Classification Search
CPC .............. B23K 11/257; B23K 11/3063; G05B 2219/45135
USPC ................................ 219/108, 110
See application file for complete search history.

(56) References Cited

U.S. PATENT DOCUMENTS

| 4,841,113 A * | 6/1989 | Hamada ................ B23K 11/115 219/110 |
| 6,024,521 A * | 2/2000 | Swaggerty ......... B23K 11/3063 409/131 |
| 6,232,572 B1 * | 5/2001 | Kanjo .................. B23K 11/115 219/110 |
| 2004/0144157 A1 * | 7/2004 | Mitani ................ B23K 11/253 73/7 |
| 2014/0183168 A1 * | 7/2014 | Arndt .................. B23K 11/255 219/86.51 |
| 2015/0001190 A1 * | 1/2015 | Cohen ................. B23K 11/253 219/117.1 |
| 2015/0108100 A1 * | 4/2015 | Haeufgloeckner .. B23K 31/125 219/109 |
| 2016/0023296 A1 * | 1/2016 | Aoki .................. B23K 11/3063 700/160 |
| 2016/0221111 A1 * | 8/2016 | Bartlett ................. B23K 11/11 |

FOREIGN PATENT DOCUMENTS

WO    WO 2015036038 A1 *  3/2015  ............. B23K 11/11

* cited by examiner

*Primary Examiner* — Dana Ross
*Assistant Examiner* — Joe E Mills, Jr.
(74) *Attorney, Agent, or Firm* — Maginot, Moore & Beck LLP

(57) ABSTRACT

A welding controller for controlling a welding operation includes a controller configured to initiate cleaning of a welding tool in a manner adapted to a change of parameters which change in a production operation in a production line in which the welding tool is included.

9 Claims, 1 Drawing Sheet

WELDING CONTROLLER AND METHOD FOR CONTROLLING A WELDING OPERATION

This application claims priority under 35 U.S.C. § 119 to patent application no. DE 10 2014 209 617.0 filed on May 21, 2014 in Germany, the disclosure of which is incorporated herein by reference in its entirety.

The present disclosure relates to a welding controller and to a method for controlling a welding operation or for producing a weld connection which may for example be a spot weld, a weld seam, etc.

BACKGROUND

In production lines such as, for example, assembly lines for vehicles etc., metal parts are connected by welding with the aid of a welding tool of a welding device. A welding gun having electrode caps is employed as a welding tool in the automatic assembly and welding of bodies. The electrode caps are contaminated on account of the welding operation, since coatings of the metal panels to be welded are deposited on the caps. In addition, contamination arises on account of the thermal process during welding. The electrode caps thus have to be cleaned at certain time intervals.

In a conventional manner, cleaning of the electrode caps is performed by means of a milling cutter which cuts off or mills away the contaminated part of the electrode cap (material: copper-chromium-zirconium; CuCrZr). The time interval between the milling operations is established in a fixed manner, having a certain maximum number of weld spots. The actual value of wear is determined by a counter (wear counter). This wear counter is incremented with each weld spot. The counter for the actual value is reset to 0 after each milling operation. Moreover, the time interval should be established so as to be dependent on the coating and the total thickness of the metal panels of the workpiece to be welded. For example, in the case of materials having a total thickness of the metal panels of less than 1.8 mm, milling is thus carried out after about every 200 weld spots; in the case of a thickness of 3 mm, the nominal preset value is approx. 400 spots. Milling has to be more frequent in the case of a hot-dip galvanized coating or an Al—Si coating than in the case of an organic coating.

It is problematic herein that a plurality of vehicle models having different model variants are produced on one assembly line and using one welding controller. Depending on how the vehicle models come onto this line, the most varied combinations of metal panels are welded. The sequence of the vehicles is random and changes continually. Thus the sequence of the combinations of metal panels which are processed within the defined milling interval also changes. Parallel thereto, the variations in the combinations of metal panels which are to be welded are steadily increasing. There are steadily increasing differences in the coatings, the latter increasingly varying in a significant manner. At the same time, the differences in the total thickness of the metal panels are also greatly increasing, on account of which the welding times vary very greatly, which likewise influences the wear of the electrode cap of the welding gun. As a result, it is impossible to establish a defined length of a milling interval. For this reason, the degree of contamination of the electrode caps within a fixed milling interval of consistent length may greatly vary today.

However, since the degree of contamination of the electrode cap influences welding quality, the degree of contamination of the electrode cap should be as uniform as possible.

In the case of difficult combinations of metal panels, such as the connections of thin panels (two metal panels) or a thick-thick-thin connection (three metal panels), this is so critical that the mentioned variance of the degree of contamination of the electrode cap has such a serious influence that weld faults, for example open spots, may occur. Here, the quality of the operator's production line is impossible to evaluate for the operator of the welding gun in a production line.

However, the wear counter does not only control electrode care. The former likewise assumes the function of readjusting the welding current. That is to say that the user may determine within the milling interval by what percentage his welding current is to be increased at a certain state of wear of the electrodes. In the case of non-adaptive welding systems, this compensates for the influences of electrode contamination on welding quality.

The requirement for a consistent degree of contamination and optimum readjustment may be served, for example, in that the user may input a wear factor for each weld spot at the user interface of the welding controller. By way of this factor, the influence of the welding time of a spot may be adapted to electrode wear.

However, this procedure has two disadvantages:

On the one hand, the effort by the customer is high and the knowledge is often not available in a conscious manner, so that conformation of the factor is forgotten when the process is changed. The resulting consequence is that in more than 95% of all cases the factor remains unchanged at 1.

On the other hand, in the case of adaptive welding controllers, the welding time is adapted by the controller for each weld spot depending on the process. However, any extension of welding time is thus not incorporated into the electrode wear.

SUMMARY

It is thus an object of the present disclosure to provide a welding controller and a method for controlling a welding operation, by way of which the aforementioned issues can be solved. In particular, a welding controller and a method for controlling a welding operation by way of which, when welding with a welding tool, consistent welding quality is achieved for each produced weld connection are to be provided.

This object is achieved by a welding controller for controlling a welding operation as described herein.

By way of the welding controller, adaptive conformation of the cleaning intervals of the welding tool, more specifically of the electrode cap, to the current production process is performed. The welding controller always initiates cleaning or milling of the electrodes, respectively, when this is also truly required.

A consistent degree of contamination of the electrode cap of a welding tool such as, for example, a welding gun, and optimal readjustment of the welding parameters after welding with the welding tool can thus be achieved by way of the welding controller. On account thereof, a consistent welding quality can be achieved for each weld connection.

Moreover, the electrode caps are not cleaned or cut off more than is necessary, such that the employment of valuable resources is optimized and costs may thus be saved.

Moreover, the object is achieved by a method for controlling a welding operation as described herein.

The method achieves the same advantages as mentioned above with reference to the welding controller.

Further potential implementations of the disclosure also comprise combinations, which are not mentioned explicitly, of features or embodiments which are described above or hereunder with reference to the exemplary embodiments.

A person skilled in the art here will also add individual aspects as improvements or additions to the respective basic form of the disclosure.

BRIEF DESCRIPTION OF THE DRAWINGS

The disclosure is described in more detail in the following with reference to the appended drawing and by means of exemplary embodiments. In the drawings.

DETAILED DESCRIPTION

Unless otherwise stated, same elements, or elements with the same function, are provided with the same reference signs in the figures.

Figure 1:
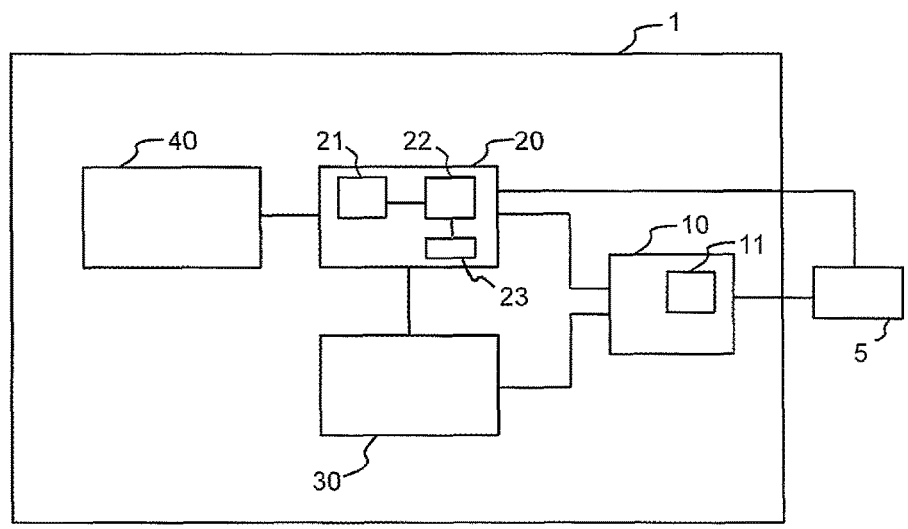
FIG. 1 shows a schematic block circuit diagram of a welding device according to a first exemplary embodiment.

FIG. 1 shows a welding device 1 which is usable in a production line such as, for example, an assembly line for vehicles, furniture, fabricated constructions, etc., in which metal parts are connected by way of welding.

The welding device 1 comprises a welding tool 10 which is controlled by a welding controller 20 for producing weld spots and/or weld seams. On account thereof, two metal components may be interconnected. The welding tool 10 may be a welding gun having an electrode cap 11, for example. The electrode cap 11 may be produced from copper-chromium-zirconium (CuCrZr), for example. The welding tool 10 may be processed in such a manner by a cleaning unit 5, which may be executed as a milling or cutting unit or an exchange unit, that the contaminated part of the electrode cap 11, if and when required, is cut off or milled away.

The welding controller 20 comprises a storage unit 21 for storing internal basic parameters or nominal values, respectively, of a welding operation using the welding tool 10, a detection unit 22 for detecting a wear factor of the electrode cap 11, and a wear counter 23 as will be explained in more detail in the following. The internal basic parameters or nominal values, respectively, may be parameters of the welding tool 10. Moreover, the internal basic parameters or nominal values, respectively, may be parameters of the welding controller 20 by way of which the welding tool 10 is controlled. In particular, the internal basic parameters or nominal values, respectively, are a welding current and a welding time.

Moreover, the welding device 1 comprises an acquisition unit 30 and an operating unit 40. The operating unit 40 may be, for example, a keyboard and/or a mouse, a laptop, a touch-sensitive or touch-insensitive display screen, etc.

The acquisition unit 30 acquires actual values of a welding operation using the welding tool 10. The actual values may be parameters of the welding tool 10. Moreover, the actual values may be parameters of the welding controller 20 by way of which the welding tool 10 is controlled. The values acquired by the acquisition unit 30 are transmitted to the welding controller 20. Moreover, the actual values may be displayed on the operating unit 40. Examples of such actual values are a welding-current value and a welding time when performing the welding operation using the welding tool 10.

Moreover, parameterization of electrode care and readjustment may be effected on the operating unit 40. The latter may assume the inactive, manual, and automatic states.

In the "inactive" state the wear counter 23 is not modified and not evaluated. Neither electrode care nor readjustment is thus active.

In the "manual" state the wear counter is incremented for each spot by the wear factor which is fixedly set for that spot. The wear factor is internally set to 1, but may be changed so as to be between 0 and 10, for example. Other settings are also possible. Electrode care and readjustment are thus active. However, there is no conformation to the individual sequence of weld spots.

In the "automatic" state the wear counter 23 is incremented by a factor or wear factor which is detected from the process data of the welding sequence or operation. Electrode care and readjustment are thus also active here. Conformation of the cleaning intervals or milling intervals to the individual sequence of weld spots thus takes place. This may also be referred to as an automatic wear counter treatment and is explained in more detail in the following.

In the case of the automatic wear counter treatment or wear counter calculation, internal basic parameters are stored as nominal values, which may be changed by the user if and when required, in the storage unit 21. Examples of such nominal values are a welding-current value equal to 8 kA and a welding time of 300 ms. These two values correspond to a wear factor of 1.

Following a welding sequence, the measured values for the actual welding-current value and the actual welding time are acquired by the acquisition unit 30, and the wear counter 23 is correspondingly updated by means thereof. For example, the actual welding-current value may be 9 kA, and the actual welding time may be 500 ms. However, other values are also possible.

Figure 2:
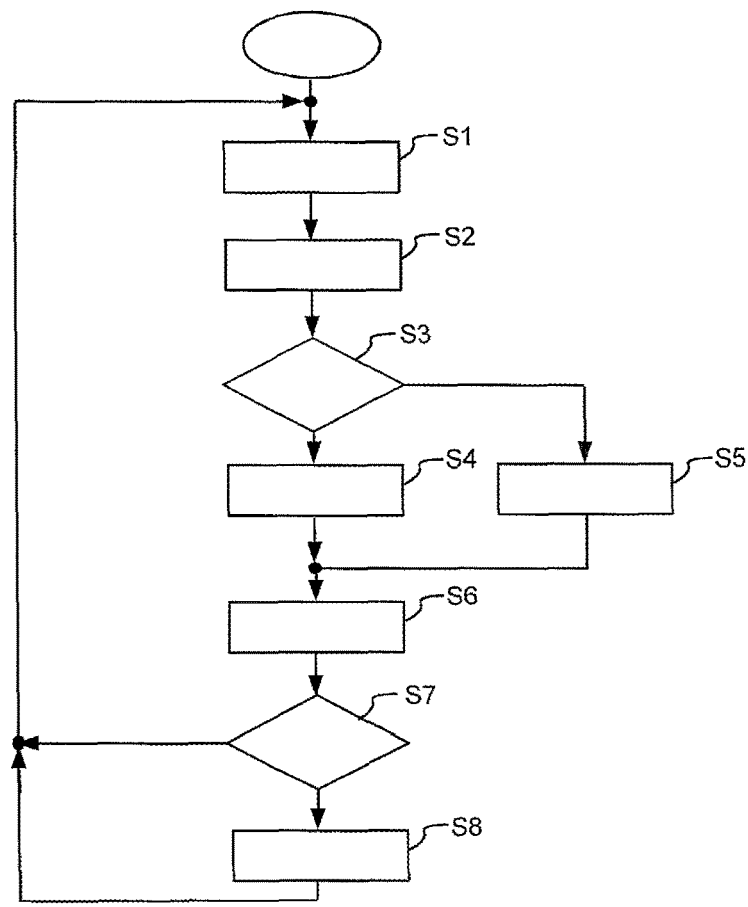
FIG. 2 shows a flow diagram of a method for controlling a welding operation, according to the first exemplary embodiment.

The function of the automatic wear counter treatment or wear counter calculation in the welding device 1 is explained in more detail by means of the flow diagram of FIG. 2. A method for controlling a welding operation in which a weld connection is produced and which is carried out by the welding controller 20 is depicted in FIG. 2.

After commencement of the method according to FIG. 2, the production of a weld connection is controlled at step S1, that is to say that a welding operation is controlled, using the welding controller 20. Thereafter, the sequence progresses to a step S2.

At step S2 the acquisition unit 30 acquires the actual values of the welding operation which has been carried out at step S1, using the welding tool 10, as has been described above. Thereafter, the sequence progresses to a step S3.

At step S3 the detection unit 22, in order to detect a wear factor of the welding tool 10, more specifically of the electrode cap 11, compares the actual values acquired at step S2 with the nominal values stored in the storage unit 21. If the acquired actual values are not equal to the stored nominal values, the sequence progresses to a step S4. Otherwise the sequence progresses to a step S5.

At step S4 the detection unit 22, in order to further detect the wear factor of the electrode cap 11, calculates a wear factor of the electrode cap 11. Here, the actual values are correlated with the internal basic parameters or the nominal values of the storage unit 21, respectively. The following applies:

Factor_welding current=actual welding current/nominal welding current, and factor_welding time=actual welding time/nominal welding time.

The true wear factor of the electrode cap 11 is calculated using the product of the factors.

Wear factor=factor_welding current*factor_welding time

Once the wear factor of the electrode cap 11 has been calculated as described above, the sequence progresses to a step S5.

In contrast, at step S5 the wear factor of the electrode cap 11 is set by the detection unit 22 to a pre-determined value, for example 1, as has been described above. The pre-determined value corresponds to the wear in the event that a weld connection is performed using the nominal values. In comparison to step S4, the calculation of the wear factor is consequently dispensed with in step S5. Thereafter, the sequence progresses to the step S7.

At step S6 the wear factor of the electrode cap 11 calculated in step S4 is added to the wear counter 23 by the detection unit 22. Thereafter, the sequence progresses to the step S7.

At step S7 the detection unit 22 compares whether the value of the wear counter 23 has reached the pre-determined reading at which cleaning of the electrode cap 11 is to be performed. If the pre-determined reading has not yet been reached, that is to say that no cleaning is required, the sequence reverts back to step S1. Otherwise the sequence progresses to a step S8.

At step S8 the cleaning unit 5, prompted by the welding controller 20, cleans the electrode cap 11 as has been described above. If cleaning by way of cutting or milling is no longer possible, the cleaning unit 5 exchanges the electrode cap 11 for a new or a newer electrode cap 11. Thereafter, the sequence reverts back to step S1.

The method is concluded when the welding device 1 is switched off. If and when required, steps S4 and S5 may also be dispensed with.

Using the detection unit 22, a wear factor of the welding tool 10 by way of which the weld connection is produced is thus detected at steps S2 to S5. If and when required, the welding tool 10 is cleaned while considering the detected wear factor.

Accordingly, the welding controller 20 after each weld connection detects the measured values of welding current and welding time of the sequence. As a result of the comparison with the reference data stored in the controller a corresponding wear factor which is added to the wear counter 23 is calculated. That is to say that the longer the welding time and the higher the welding current, the greater the resulting contamination of the electrode cap 11 on account of this welding sequence. However, as these two values increase, the calculated wear factor for such a weld connection also increases. The wear factor for such a weld connection thus reaches the parameterized maximum electrode wear more rapidly, and the electrode cap 11 is cleaned or milled, respectively, earlier.

The advantage of the automatic wear counter treatment or wear counter calculation in the case of the welding device 1 is an optimal time interval, adapted to the production process, for the cleaning interval within production. The influence of model variations, diversity of coatings, and thickness of metal panels is balanced and no longer plays a part. Changes in the production sequence (new model, repositioning of weld spots) no longer have to be considered with a view to setting cleaning intervals. Consistent welding quality is thus ensured.

In a second exemplary embodiment the automatic wear counter treatment or wear counter calculation in the welding device 1 is carried out only based on the welding current. The wear factor is thus calculated using only the factor_welding current, and thus as:

wear factor=actual welding current/nominal welding current.

In a third exemplary embodiment the automatic wear counter treatment or wear counter calculation in the welding device 1 is carried out only based on the welding time. The wear factor is thus calculated using only the factor_welding time, and thus as:

wear factor=actual welding time/nominal welding time.

All design embodiments as described above of the welding device 1, of the welding controller 20, and of the method may be used individually or in all possible combinations. In particular, all features and/or functions of the exemplary embodiments described above may be combined in an arbitrary manner. In addition, the following modifications are conceivable, in particular.

The parts illustrated in the figures are illustrated in a schematic manner and in the exact design embodiment may deviate from the shapes shown in the figures, as long as their functions described above are ensured.

The automatic wear counter treatment or wear counter calculation in the welding device 1 may also be carried out based on other parameters of the welding tool 10 or of the welding controller 20.

What is claimed is:
1. A welding system, comprising:
a welding tool configured to produce weld connections, the welding tool having an electrode cap;
a cleaning device configured to clean the electrode cap by at least one of cutting and milling a contaminated part of the electrode cap; and
a controller operably connected to the welding tool and the cleaning device, the controller being programmed to:
store nominal control parameters of the welding tool in a storage device, the nominal control parameters including at least one of (i) a nominal welding current and (ii) a nominal welding time;
control the welding tool to perform welding operations;
receive actual control parameters of the welding tool of the welding operations from an acquisition device, the actual control parameters including at least one of (i) actual welding currents of the welding operations and (ii) actual welding times of the welding operations;
determine, for each welding operation, a wear factor based on at least one of (i) a comparison of the actual welding current of the respective welding operation with the nominal welding current and (ii) a comparison of the actual welding time of the respective welding operation with the nominal welding time;
increment, for each welding operation, a wear value by the determined wear factor; and
initiate cleaning of the electrode cap of the welding tool by the cleaning device in response to the wear value reaching a first pre-determined value.

2. The welding system according to claim 1, the controller being further programmed to:
  count a number of weld operations performed by the welding tool; and
  initiate cleaning of the electrode cap of the welding tool by the cleaning device in response to the counted number of weld operations reaching a second predetermined value.

3. The welding system according to claim 1, the controller being further programmed to:
  determine, for each welding operation, the wear factor based (i) the comparison of the actual welding current of the respective welding operation with the nominal welding current and (ii) the comparison of the actual welding time of the respective welding operation with the nominal welding time.

4. The welding controller according to claim 1, the controller being further programmed to:
  determine, for each welding operation, the wear factor as a product of a factor welding current and a factor welding time,
  wherein the factor welding current is equal to the actual welding current of the respective welding operation divided by the nominal welding current, and the factor welding time is equal to the actual welding time of the respective welding operation divided by the nominal welding time.

5. The welding device according to claim 1, further comprising:
  an input device configured to enable parameterization of the cleaning of the electrode cap and readjustment of the welding tool,
  wherein the cleaning of the electrode cap and the readjustment are configurable in an inactive state, a manual state, or an automatic state.

6. A method for controlling a welding system having (i) a welding tool configured to produce weld connections, the welding tool having an electrode cap, and (ii) a cleaning device configured to clean the electrode cap by at least one of cutting and milling a contaminated part of the electrode cap, the method comprising:
  storing nominal control parameters of the welding tool in a storage device, the nominal control parameters including at least one of (i) a nominal welding current and (ii) a nominal welding time;
  controlling the welding tool to perform welding operations;
  receiving actual control parameters of the welding tool of for the welding operations from an acquisition device, the actual control parameters including at least one of (i) actual welding currents of the welding operations and (ii) actual welding times of the welding operations;
  determining, for each welding operation, a wear factor at least one of (i) a comparison of the actual welding current of the respective welding operation with the nominal welding current and (ii) a comparison of the actual welding time of the respective welding operation with the nominal welding time;
  incrementing, for each welding operation, a wear value by the determined wear factor; and
  initiating cleaning of the electrode cap of the welding tool by the cleaning device in response to the wear value reaching a first pre-determined value.

7. The method according to claim 6, further comprising:
  counting a number of weld operations performed by the welding tool; and
  initiating cleaning of the electrode cap of the welding tool by the cleaning device in response to the counted number of weld operations reaching a second predetermined value.

8. The method according to claim 6, the determining further comprising:
  determine, for each welding operation, the wear factor based (i) the comparison of the actual welding current of the respective welding operation with the nominal welding current and (ii) the comparison of the actual welding time of the respective welding operation with the nominal welding time.

9. The method according to claim 6, the determining further comprising:
  determining, for each welding operation, the wear factor as a product of a factor welding current and a factor welding time,
  wherein the factor welding current is equal to the actual welding current of the respective welding operation divided by the nominal welding current, and the factor welding time is equal to the actual welding time of the respective welding operation divided by the nominal welding time.

* * * * *

UNITED STATES PATENT AND TRADEMARK OFFICE
CERTIFICATE OF CORRECTION

PATENT NO. : 10,179,372 B2
APPLICATION NO. : 14/717699
DATED : January 15, 2019
INVENTOR(S) : Juergen Haeufgloeckner It is certified that error appears in the above-identified patent and that said Letters Patent is hereby corrected as shown below:

In the Claims

In Column 8, Lines 3-4, Lines 13-14 of Claim 6 should read:
receiving actual control parameters of the welding tool of
    the welding operations from an acquisition device, Signed and Sealed this
Ninth Day of April, 2019

Andrei Iancu
*Director of the United States Patent and Trademark Office*